Dec. 13, 1966   M. KAUFMAN   3,291,334
BAKE PAN UNIT
Filed Dec. 20, 1965
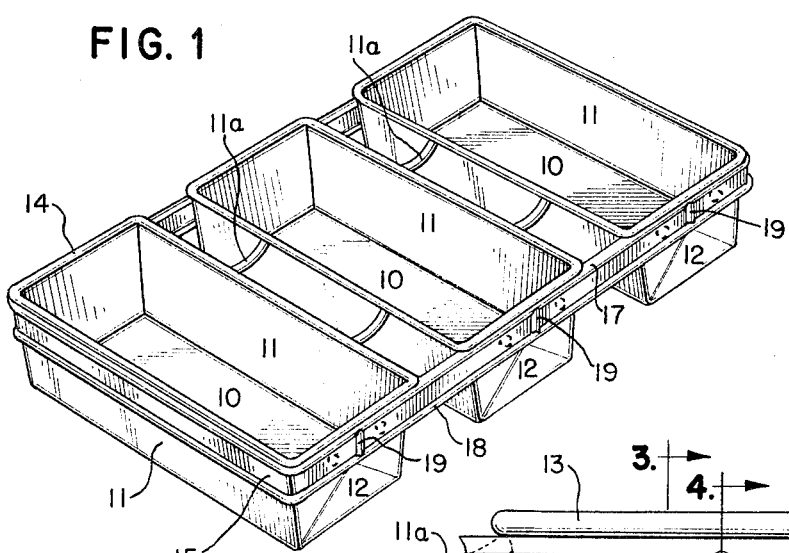
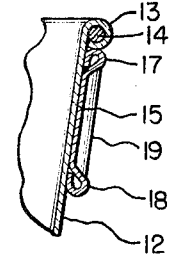
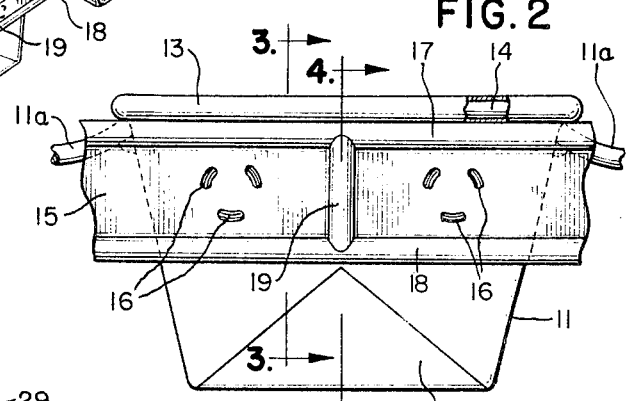
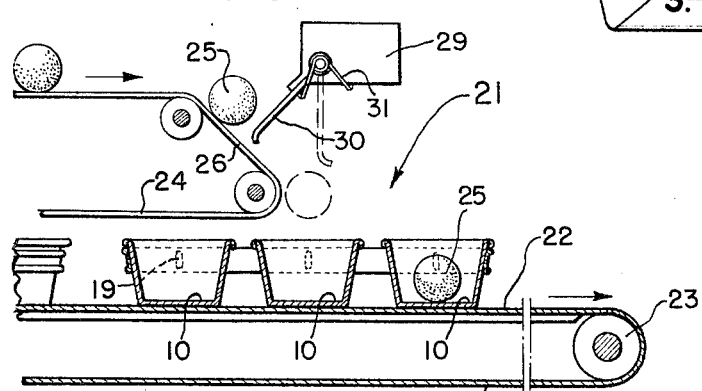
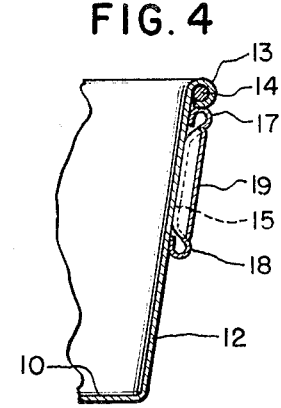
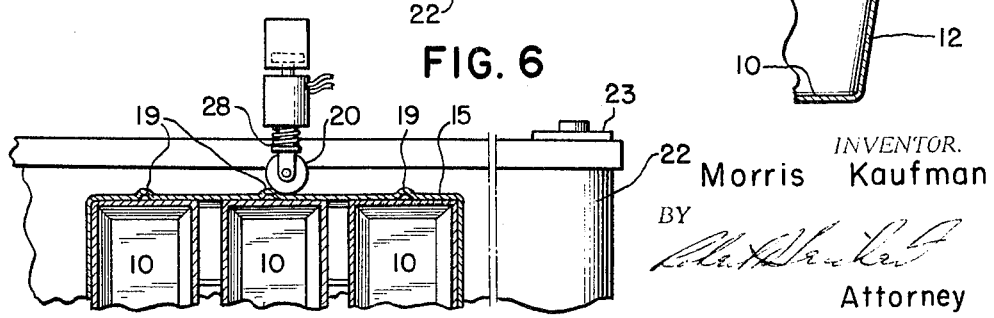
INVENTOR.
Morris Kaufman
BY
Attorney

United States Patent Office 3,291,334
Patented Dec. 13, 1966

3,291,334
BAKE PAN UNIT
Morris Kaufman, Morton Grove, Ill., assignor to American Home Products Corporation, New York, N.Y., a corporation of Delaware
Filed Dec. 20, 1965, Ser. No. 524,993
1 Claim. (Cl. 220—23.2)

This invention relates to a bake pan unit and more particularly to a pan unit especially designed for use in conjunction with machines which deliver shaped lumps of dough to the pans of such a unit while said pans are successively moved toward and away from stationary position for receiving said lumps of dough.

It is an object of this invention to provide a pan unit for the purpose indicated having novel means incorporated therein for establishing the stationary position of each pan as it arrives in registry with the dough depositing mechanism.

The foregoing and other features and advantages of the present invention will become apparent upon reading the following detailed description of the invention taken in conjunction with the drawings, wherein:

FIG. 1 is a top perspective view of a bake pan unit having a strapping member provided with a side index feature according to this invention.

FIG. 2 is an enlarged fragmentary side elevation of the unit shown in FIG. 1.

FIG. 3 is a vertical section taken along line 3–3 of FIG. 2.

FIG. 4 is a vertical section taken along line 4–4 of FIG. 2.

FIG. 5 is a side elevational view of a typical loaf moulding and automatic panning device showing a pan unit according to this invention in a position to accept an article of dough as delivered by said device.

FIG. 6 is a horizontal sectional view showing the pan unit in operative relationship with the indexing mechanism of the automatic panning device shown in FIG 5.

A bake pan unit typifying the present invention, as shown in FIG. 1 of the drawings, includes a series of baking pans each having a bottom wall 10 of rectangular plan surrounded by upstanding side walls 11 and end walls 12. Encircling the walls 11 and 12 of each pan and crimped within a flange 13 provided along the upper portion of the walls 11 and 12 is a wire 14 which produces a continuous outstanding reinforcing or stiffening bead along the upper periphery of each of the pans in the pan unit. The pans are secured in spaced apart relation with the end walls 12 in alignment by means of a metal strapping member 15 positioned along and secured in fixed position against the walls of the pans which define the outer periphery of the pan unit. The strapping member 15, as shown in the drawings, is secured to the walls of the pans opposite thereto by suitable fastening means. As shown in the drawings, a welded connection 16 is effective to establish the pans and strapping member in fixed relation. Spacer 11a of any suitable design and construction are mounted between the side walls of the pans and fixed thereto in any suitable manner.

While the strapping member thus provides pan wall-encompassing arms along the end walls of the assembly, it also serves to reinforce the area of the pan walls enclosed thereby. To augment such reinforcement, the upper edge of the strap is rebent upon itself to define a hollow bead 17 which is preferably positioned in close underlying relation to the reinforcing bead along the upper edge of the pans. A similar bead 18 provided along the lower edge of the strap also aids in adding rigidity to the assembly as well as to define a downwardly facing shoulder for limiting the depth of nesting of the bake pan unit within a subjacent pan unit of similar size and shape, as desired when storing the empty pan units in stacked relation. The beaded edges 17 and 18 accordingly provided in the strapping member, it will be noted, occupy positions in outwardly offset relation to the area of the strapping member between said edges. The area of the strapping thus bridging the distance between said edges 17 and 18 presents a substantially planar upright surface throughout the total exposed area of the strapping member except for an outwardly offset upright rib 19 formed integrally with the strapping member 15 at locations spaced apart horizontally a distance matching the center-to-center distance of the end walls of the pans. The rib 19, as shown in FIG 6, provides a detent for releasable engagement by indexing means 20 for stopping the pans in registry with dough depositing mechanism, designated generally by reference numeral 21 in FIG. 5. As shown in FIGS. 5 and 6, a conveyor belt 22 acting in conjunction with pulleys, such as pulley 23, delivers the pan unit into receiving relation to the discharge end of a conveyor 24 occupying a position in overhead relation to the area occupied by the pan unit. While the rib 19 of a selected pan of the pan unit is thus engaged by the indexing means 20, the pan unit is detained so as to hold the pan with which the engaged rib 19 is associated in a position to accept a lump of dough 25 from said conveyor 24 via a downwardly and forwardly inclined run 26 of the conveyor 24. A spring 28 normally urges the indexing means 20 into an advanced position for engaging the rib 19 as shown in FIG. 6. However, control mechanism which responds to energization of an electric circuit via closing of a switch 29 is operative upon such energization to overcome the resistance of spring 28 and thereby withdraw the indexing means 20 and thus free the pan unit from engagement with said indexing means. Operation of the switch 29 to so energize the circuit to the control mechanism of the indexing means is effected by rocking movement of a pivoted vane 30 from an upward position to a lowered position. As shown in FIG. 5, as the dough piece 25 slides down the inclined portion 26 of the conveyor 24, it deflects the vane 30 into said lowered position whereupon the switch 29 is actuated to energize the circuit controlling withdrawal of the indexing means out of engagement with the pan unit. A spring 31 normally urges the vane to occupy an upward position. Accordingly vane 30 upon return to such upward position operates the switch to deenergize the circuit controlling withdrawal of the indexing means whereupon the pan unit is re-engaged by the indexing means as shown in FIG. 6 so as to detain the pan unit in a position to present a succeeding pan in readiness to receive a succeeding lump of dough 25. When the succeeding lump of dough 25 engages the vane 30 so as to deflect the same and thereby operate the switch 29 to energize the circuit to the controls associated with the indexing means, the operation of the indexing means to release the pan unit is repeated.

While FIG. 6 of the drawings discloses only a portion of the bake pan unit along one side of the path travelled by the unit while undergoing indexing action by an indexing member 20, it is to be understood that FIG. 6, if extended to reveal the full width of the pan unit as well as the portion of the apparatus at the side opposite to that as presently revealed in FIG. 6, would disclose a duplicate portion of the bake pan unit as having a rib 19 at locations on the strapping member spaced apart horizontally a distance matching the center-to-center distance of the end walls 12 of the pans, and would disclose an indexing member for engagement by said latter ribs 19 which duplicates the indexing member 20 shown in FIG. 6.

What is claimed is:

A bake pan unit adapted for use with high speed loaf moulding and automatic panning equipment wherein loaf placement in said unit is timed with arrival of said unit between indexing fingers movable between advanced and retracted positions relative to and at opposite sides of a fixed path in which said pan unit travels enroute to and from said equipment, said pan unit comprising a series of duplicate open top pans, and duplicate strap members securing said pans in fixed aligned relation in a row extending lengthwise of said path of travel, each strapping member having top and bottom edges defined by an outwardly beaded rim coextensive with the dimension of said unit measured lengthwise of and occupying uniformly vertically spaced apart positions parallel to said path of travel, each strap member presenting a substantially planar upright surface throughout the entire exposed area of said strap member between said beads except for an outwardly offset upright rib formed integrally with said strap member at locations spaced apart a distance matching the center-to-center distance of said pans to thereby provide means engageable with said indexing fingers to stop movement of said pan unit along said path of travel when said fingers are in advanced position.

No references cited.

LOUIS G. MANCENE, *Primary Examiner.*

J. B. MARBERT, *Assistant Examiner.*